US012242451B2

(12) United States Patent
Ramakrishna et al.

(10) Patent No.: US 12,242,451 B2
(45) Date of Patent: Mar. 4, 2025

(54) DETERMINING REFERENCES TO PREDEFINED TYPES OF RECORDS

(71) Applicant: SAP SE, Walldorf (DE)

(72) Inventors: Panish Ramakrishna, Bengaluru (IN); Anis Kasmani, Union City, CA (US); Prithvi Krishna Thodla Chandrasekhar, Pleasanton, CA (US); Arasan Rajendren, San Diego, CA (US); Sriram Narasimhan, Pleasanton, CA (US)

(73) Assignee: SAP SE, Walldorf (DE)

( * ) Notice: Subject to any disclaimer, the term of this patent is extended or adjusted under 35 U.S.C. 154(b) by 53 days.

(21) Appl. No.: 17/894,865

(22) Filed: Aug. 24, 2022

(65) Prior Publication Data

US 2024/0070134 A1    Feb. 29, 2024

(51) Int. Cl.
*G06F 16/00* (2019.01)
*G06F 16/21* (2019.01)
*G06F 16/22* (2019.01)

(52) U.S. Cl.
CPC ............ *G06F 16/221* (2019.01); *G06F 16/21* (2019.01); *G06F 16/2255* (2019.01)

(58) Field of Classification Search
CPC ......... G06F 16/221; G06F 16/21; G06F 16/22
See application file for complete search history.

(56) References Cited

U.S. PATENT DOCUMENTS

| 9,860,229 | B2 | 1/2018 | Miles et al. |
| 10,169,446 | B1* | 1/2019 | Garlapati ............... G06F 16/284 |
| 10,311,051 | B1* | 6/2019 | Diaz Pabon .......... G06F 16/245 |
| 2012/0239612 | A1 | 9/2012 | George et al. |
| 2014/0101201 | A1 | 4/2014 | Yan et al. |
| 2015/0088809 | A1 | 3/2015 | Kociubes et al. |
| 2019/0171626 | A1 | 6/2019 | Pingry et al. |
| 2019/0311057 | A1 | 10/2019 | Sung et al. |
| 2022/0141276 | A1 | 5/2022 | Sun et al. |
| 2024/0184806 | A1 | 6/2024 | Haelen |

OTHER PUBLICATIONS

Non-Final Office Action for U.S. Appl. No. 17/894,856, dated Jan. 5, 2024, 15 pgs.

\* cited by examiner

*Primary Examiner* — Thu Nguyet T Le
(74) *Attorney, Agent, or Firm* — Fountainhead Law Group, PC

(57) ABSTRACT

Some embodiments provide a program that receives a set of data for a first record in a first table. The set of data comprises a set of values for a set of attributes. In a data loading process configured to load a subset of the set of data into a subset of a first set of columns in the first table, the program determines that a first column in a first set of columns does not belong in the subset of the first set of columns. The program generates the first record in the first table. The program generates a value for the first column in the first set of columns that refers to a second record in the second table configured to represent a defined type of record. The program stores the value in the first column in the first set of columns of the first record.

20 Claims, 12 Drawing Sheets

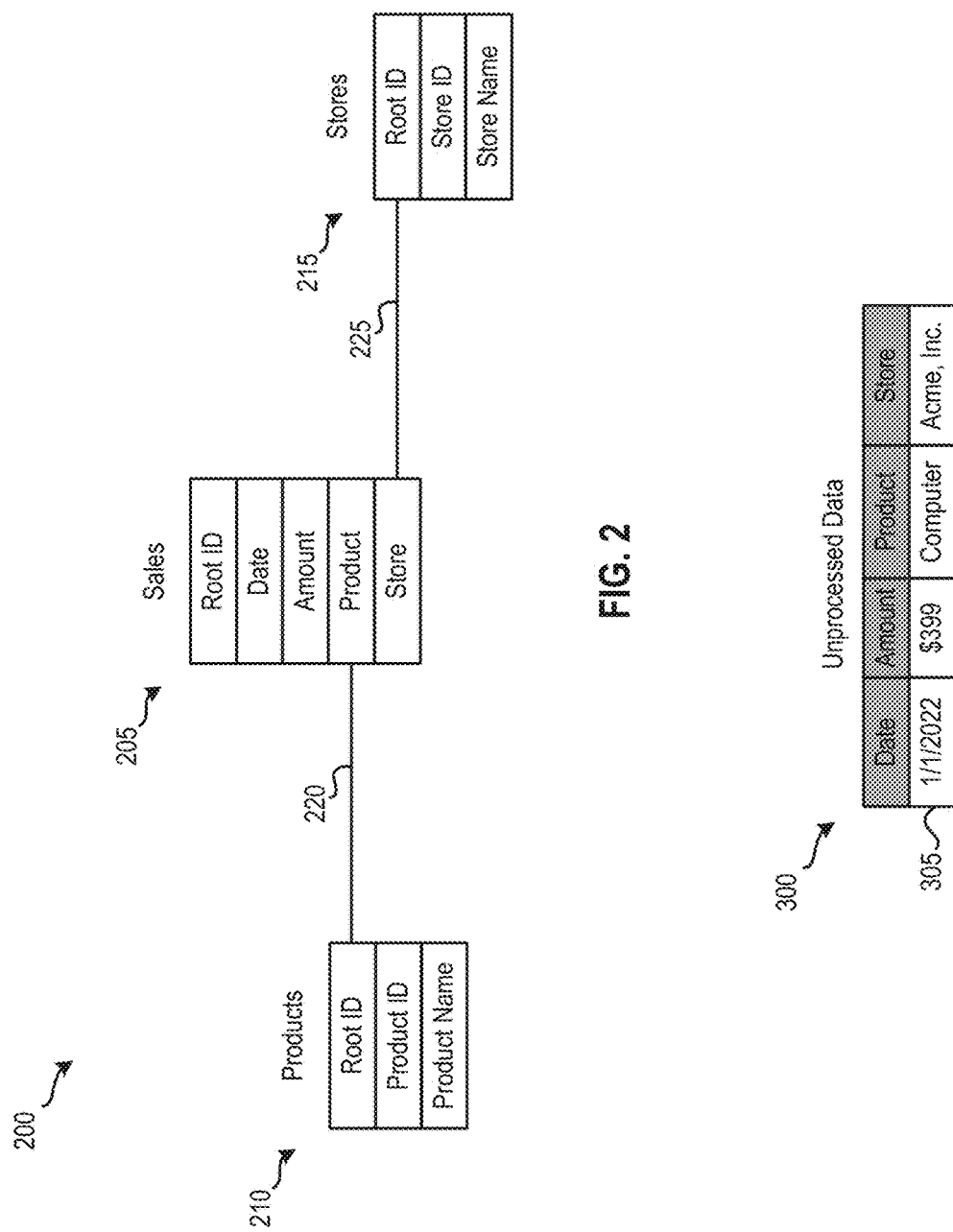

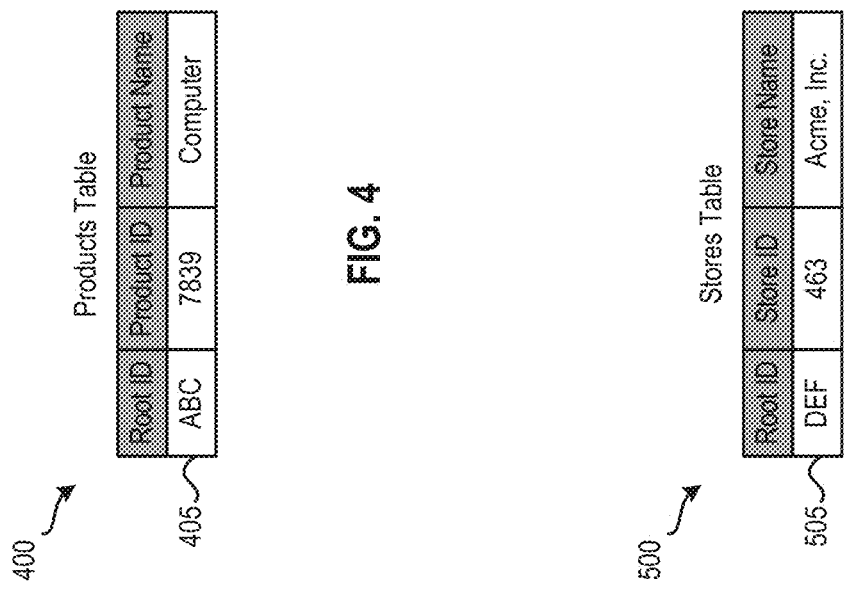

Sales Table

| Root ID | Date | Amount | Product | Store |
|---|---|---|---|---|
| 1001 | 1/1/2022 | $399 | ABC | |

Sales Table

| Root ID | Date | Amount | Product | Store |
|---|---|---|---|---|
| 1001 | 1/1/2022 | $399 | ABC | DEF |

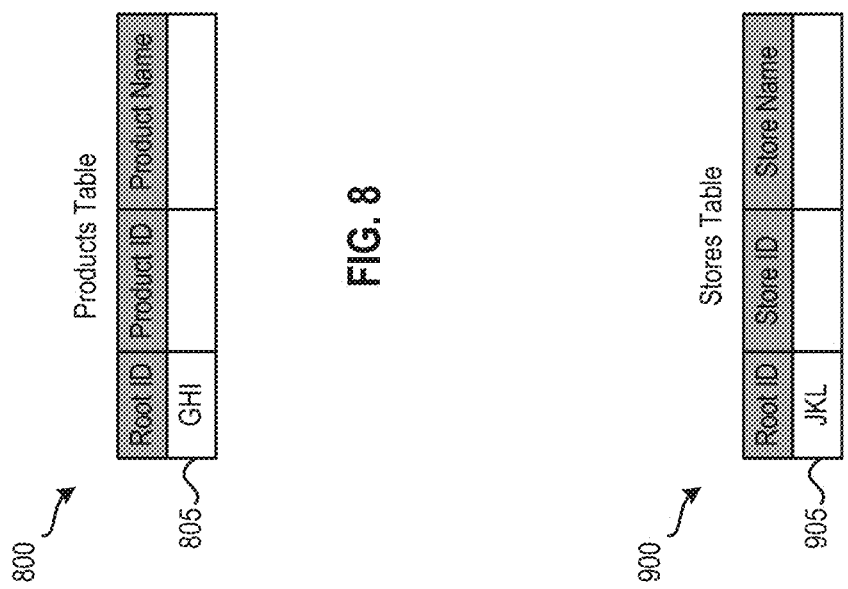

Sales Table

| Root ID | Date | Amount | Product | Store |
|---|---|---|---|---|
| 1001 | 1/1/2022 | $399 | ABC | JKL |

Sales Table

| Root ID | Date | Amount | Product | Store |
|---|---|---|---|---|
| 1001 | 1/1/2022 | $399 | ABC | DEF |

DETERMINING REFERENCES TO PREDEFINED TYPES OF RECORDS

BACKGROUND

Databases are generally used for organizing data and providing access to such data. There are many approaches to managing the data stored in databases. One way to manage data in databases is using a relational model where data is modeled according to relations and/or tables. For relational models, various methods of how to structure the relations and/or tables. For example, a star schema is a type of relational database schema where one or more fact tables are used to store measurements, metrics, and/or fact data and one or more dimension tables are used to describe data in the fact table.

SUMMARY

In some embodiments, a non-transitory machine-readable medium storing a program executable by at least one processing unit of a device. The program receives a set of data for a first record in a first table. The set of data comprises a set of values for a set of attributes. The first table comprises a first set of columns. A first column in the first set of columns in the first table is configured to refer to a second column in a second set of columns in a second table. In a data loading process configured to load a subset of the set of data into a subset of the first set of columns in the first table, the program further determines that the first column in the first set of columns in the first table does not belong in the subset of the first set of columns in the first table. The program also generates the first record in the first table. The program further generates a value for the first column in the first set of columns in the first table, the value referring to a second record in the second table configured to represent a defined type of record. The program also stores the value in the first column in the first set of columns of the first record.

In some embodiments, the set of data is a first set of data comprising a first set of values for a first set of attributes. The data load process is a first data load process, the subset of the first set of columns in the first table is a first subset of the first set of columns in the first table, and the value is a first value. The program further receives a second set of data for the first record in the first table, the second set of data comprising a second set of values for a second set of attributes; in a second data loading process configured to load a subset of the second set of data into a second subset of the first set of columns in the first table, determines that the first column in the first set of columns in the first table belongs in the second subset of the first set of columns in the first table; generates a second value for the first column in the first set of columns in the first table based on a subset of the second set of values for a subset of the second set of attributes; and replaces the first value with the second value in the first column in the first set of columns of the first record.

In some embodiments, a third column in the first set of columns in the first table is configured to refer to a fourth column in a third set of columns in a third table. The value is a first value. The program further, in the data loading process, determines that the third column in the first set of columns in the first table belongs in the subset of the first set of columns in the first table; generates a second value for the third column in the first set of columns in the first table based on a subset of the set of values for a subset of the set of attributes, the second value referring to a third record in the third table, the third record comprising the subset of the set of values for the subset of the set of attributes; and stores the second value in the third column in the first set of columns of the first record. Generating the second value comprises providing the subset of the set of values for the subset of the set of attributes as inputs to a hash function, wherein the hash function is configured to generate an output based on the subset of the set of values for the subset of the set of attributes; and using the output as the second value.

In some embodiments, the program further generates the second record in the second table. The second column in the second set of columns in the second table is configured to store unique values for identifying unique records in the second table. The program further receives a column definition for the second column in the second set of columns in the second table, the column definition specifying to generate a unique value for each record in the second table based on values for a subset of the second set of columns in the second table. Generating the value is based on the column definition for the second column in the second set of columns in the second table.

In some embodiments, a method receives a set of data for a first record in a first table. The set of data comprises a set of values for a set of attributes. The first table comprises a first set of columns. A first column in the first set of columns in the first table is configured to refer to a second column in a second set of columns in a second table. In a data loading process configured to load a subset of the set of data into a subset of the first set of columns in the first table, the method further determines that the first column in the first set of columns in the first table does not belong in the subset of the first set of columns in the first table. The method also generates the first record in the first table. The method further generates a value for the first column in the first set of columns in the first table, the value referring to a second record in the second table configured to represent a defined type of record. The method also stores the value in the first column in the first set of columns of the first record.

In some embodiments, the set of data is a first set of data comprising a first set of values for a first set of attributes. The data load process is a first data load process, the subset of the first set of columns in the first table is a first subset of the first set of columns in the first table, and the value is a first value. The method further receives a second set of data for the first record in the first table, the second set of data comprising a second set of values for a second set of attributes; in a second data loading process configured to load a subset of the second set of data into a second subset of the first set of columns in the first table, determines that the first column in the first set of columns in the first table belongs in the second subset of the first set of columns in the first table; generates a second value for the first column in the first set of columns in the first table based on a subset of the second set of values for a subset of the second set of attributes; and replaces the first value with the second value in the first column in the first set of columns of the first record.

In some embodiments, a third column in the first set of columns in the first table is configured to refer to a fourth column in a third set of columns in a third table. The value is a first value. The method further, in the data loading process, determines that the third column in the first set of columns in the first table belongs in the subset of the first set of columns in the first table; generates a second value for the third column in the first set of columns in the first table based on a subset of the set of values for a subset of the set of attributes, the second value referring to a third record in the third table, the third record comprising the subset of the set of values for the subset of the set of attributes; and stores the second value in the third column in the first set of columns of the first record. Generating the second value comprises providing the subset of the set of values for the subset of the set of attributes as inputs to a hash function, wherein the hash function is configured to generate an output based on the subset of the set of values for the subset of the set of attributes; and using the output as the second value.

In some embodiments, the method further generates the second record in the second table. The second column in the second set of columns in the second table is configured to store unique values for identifying unique records in the second table. The method further receives a column definition for the second column in the second set of columns in the second table, the column definition specifying to generate a unique value for each record in the second table based on values for a subset of the second set of columns in the second table. Generating the value is based on the column definition for the second column in the second set of columns in the second table.

In some embodiments, a system comprises a set of processing units and a non-transitory machine-readable medium that stores instructions. The instructions cause at least one processing unit to receive a set of data for a first record in a first table. The set of data comprises a set of values for a set of attributes. The first table comprises a first set of columns. A first column in the first set of columns in the first table is configured to refer to a second column in a second set of columns in a second table. In a data loading process configured to load a subset of the set of data into a subset of the first set of columns in the first table, the instructions further cause the at least one processing unit to determine that the first column in the first set of columns in the first table does not belong in the subset of the first set of columns in the first table. The instructions also cause the at least one processing unit to generate the first record in the first table. The instructions further cause the at least one processing unit to generate a value for the first column in the first set of columns in the first table, the value referring to a second record in the second table configured to represent a defined type of record. The instructions also cause the at least one processing unit to store the value in the first column in the first set of columns of the first record.

In some embodiments, the set of data is a first set of data comprising a first set of values for a first set of attributes. The data load process is a first data load process, the subset of the first set of columns in the first table is a first subset of the first set of columns in the first table, and the value is a first value. The instructions further cause the at least one processing unit to receive a second set of data for the first record in the first table, the second set of data comprising a second set of values for a second set of attributes; in a second data loading process configured to load a subset of the second set of data into a second subset of the first set of columns in the first table, determine that the first column in the first set of columns in the first table belongs in the second subset of the first set of columns in the first table; generate a second value for the first column in the first set of columns in the first table based on a subset of the second set of values for a subset of the second set of attributes; and replace the first value with the second value in the first column in the first set of columns of the first record.

In some embodiments, a third column in the first set of columns in the first table is configured to refer to a fourth column in a third set of columns in a third table. The value is a first value. The instructions further cause the at least one processing unit to, in the data loading process, determine that the third column in the first set of columns in the first table belongs in the subset of the first set of columns in the first table; generate a second value for the third column in the first set of columns in the first table based on a subset of the set of values for a subset of the set of attributes, the second value referring to a third record in the third table, the third record comprising the subset of the set of values for the subset of the set of attributes; and store the second value in the third column in the first set of columns of the first record. Generating the second value comprises providing the subset of the set of values for the subset of the set of attributes as inputs to a hash function, wherein the hash function is configured to generate an output based on the subset of the set of values for the subset of the set of attributes; and using the output as the second value.

In some embodiments, the instructions further cause the at least one processing unit to generate the second record in the second table. The second column in the second set of columns in the second table is configured to store unique values for identifying unique records in the second table. The instructions further cause the at least one processing unit to receive a column definition for the second column in the second set of columns in the second table, the column definition specifying to generate a unique value for each record in the second table based on values for a subset of the second set of columns in the second table.

The following detailed description and accompanying drawings provide a better understanding of the nature and advantages of various embodiments of the present disclosure.

BRIEF DESCRIPTION OF THE DRAWINGS

FIG. 2 illustrates an example database schema according to some embodiments.

FIG. 3 illustrates an example of unprocessed data according to some embodiments.

FIG. 4 illustrates an example products table according to some embodiments.

FIG. 5 illustrates an example stores table according to some embodiments.

FIGS. 6A and 6B illustrate an example sales table according to some embodiments.

FIG. 8 illustrates another example products table according to some embodiments.

FIG. 9 illustrates another example stores table according to some embodiments.

FIGS. 12A and 12B illustrate another example sales table according to some embodiments.

DETAILED DESCRIPTION

Figure 1:
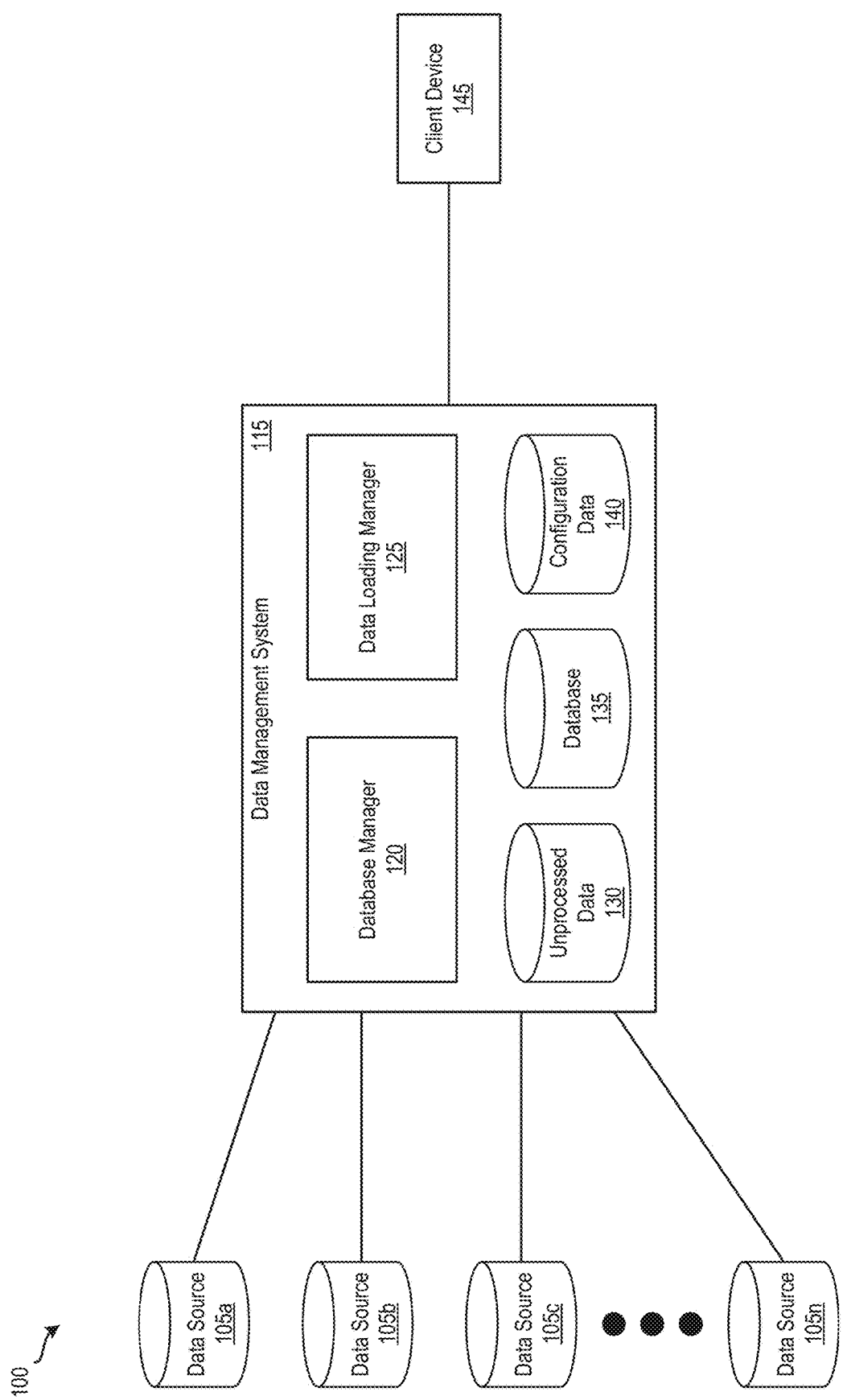
FIG. 1 illustrates a system for independently loading related data into data storages according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for independently loading related data into data storages. In some embodiments, a data management system is configured to manage data stored in databases. In addition, the data management system can be configured to receive unprocessed data from a number of different data sources. The data management system may process unprocessed data in several loads where different loads are configured to process different attributes of the unprocessed data. When the data management system loads data into a first column of a record in a first table where the first column is related to a first column in a second table, the data management system uses a column definition for the first column in the second table to determine the value to store in the first column of the record in the first table. The column definition may specify how to determine a value for uniquely identify records in the second table. For example, the column definition may specify to use a hash function on a particular column(s) in the second table and use the output of the hash function as the determined value.

The techniques for independently loading related data into data storages described in the present application provide a number of benefits and advantages over conventional methods for loading related data into data storages. Typically, a relationship data modeling approach uses primary keys and foreign keys to form a join between data related across two tables (e.g., a fact and a dimension). If a first table does not have a particular record with a given primary key then inserts for records in the second table referencing the particular record in the first table can either fail or some complex logic may be needed to create the particular record in the first table. This causes data loads to be sequenced in a way that the first table is processed before the second table. The relationship data modeling approach generally increases the number of joins utilized, the computing time to process queries, and the complexity of the data processing. By generating the reference identifiers using data values in one or more columns in the first table breaks the dependence between the first and second tables thereby allowing data to be loaded in the first and second tables independently.

Furthermore, described herein are techniques for determining references to predefined types of records. In some embodiments, the data management system generates predefined records in tables of databases. The predefined records can serve as placeholder records that unprocessed columns of records in other tables can temporarily reference until the unprocessed columns are later processed. For instance, when the data management system detects a second column of a record in the first table for which the current load is not configured to process data and the second column in the first table is related to a second column in the second table, the data management system can determine a value that references a predefined record in the second table. In some cases, the data management system uses a column definition for the second column in the second table to determine the value to store in the second column of the record in the first table. For example, if the column definition for the second column specifies to use a hash function on a particular column(s) in the second table and use the output of the hash function as the determined value, the data management system uses a predefined value as input to the hash function. The output of the hash function is a value that references the predefined record in the second table. In a subsequent load that is configured to process data for the second column of the record in the first table, the data management system uses the actual data associated with the second column in the record as input to the hash function and then replaces the value referencing the predefined record in the second table with the new output of the hash function.

The techniques for determining references to predefined types of records described in the present application provide a number of benefits and advantages over conventional methods for determining references to predefined types of records. For instance, the techniques described here determine references to predefined types of records based on the values of columns in a table. As such, the value of the references changes based on the values of the columns in a table. On the other hand, some conventional approaches use fixed or hard-coded reference values.

FIG. 1 illustrates a system 100 for independently loading related data into data storages according to some embodiments. As shown, system 100 includes data sources 105a-n, data management system 115, and client device 145. Each of the data sources 105a-n is configured to provide data to data management system 115 for processing. Each of the data sources 105a-n may be an application, a service, a computing system, another data management system, etc. Client device 145 can interact with data management system 115. For example, a user of client device 145 may send data management system 115 requests to create databases for data management system 115 to manage. In addition, a user of client device 145 can provide data management system 115 with configuration information for databases to be created by data management system 115. In some cases, a user of client device 145 may send data management system 115 requests for data (e.g., reports) stored in databases managed by data management system 115. In response to such requests, client device 145 receives the requested data from data management system 115.

As illustrated in FIG. 1, data management system 115 includes database manager 120, data loading manager 125, and storages 130-140. Unprocessed data storage 130 is configured to store data that is to be processed by data management system 115. For instance, such data may include data received from data sources 105a-n. Database storage 135 stores databases. Configuration data storage 140 can store configuration information for the databases stored in database storage 135. In some embodiments, storages 130-145 are implemented in a single physical storage while, in other embodiments, storages 130-140 may be implemented across several physical storages. While FIG. 1 shows unprocessed data storage 130, database storage 135, and configuration data storage 140 as part of data management system 115, one of ordinary skill in the art will appreciate that unprocessed data storage 130, database storage 135, and/or configuration data storage 140 may be external to data management system 115 in some embodiments.

Database manager 120 is responsible for managing databases. For example, database manager 120 can receive from client device 145 a request to create a database. Along with the request to create a database, database manager 120 may receive configuration information for the database, which database manager 120 stores in configuration data storage 140. Examples of configuration information may include a set of tables to include in the database, a set of columns to include in each of the tables, the type of data (e.g., integers, floating point numbers, Booleans, strings, dates, timestamps, etc.) that can be stored in each of the table columns, relationships between the tables (e.g., primary keys, foreign keys, etc.), etc. In response to the request and configuration information, database manager 120 generates the database and stores it in database storage 135. Also, database manager 120 can received data from data sources 105a-n, which database manager 120 stores in unprocessed data storage 130.

Data loading manager 125 is configured to manage the loading of data into databases stored in database storage 135. For example, data loading manager 125 can process unprocessed data stored in unprocessed data storage 130 and then load them in databases stored in database storage 135. In some embodiments, data loading manager 125 processes unprocessed data at defined intervals (e.g., once every fifteen minutes, once an hour, once a day, etc.). In other embodiments, data loading manager 125 processes unprocessed data when data is received from a data source 105. In some instances, data loading manager may process unprocessed data for a particular database stored in database storage 135 in multiple phases (also referred to as loads). For example, in some such instances, data loading manager 125 can process unprocessed data for a portion of the columns in a table in a database in a first load. Then, in a second load, data loading manager 125 can process unprocessed data for another, different portion of columns in the table of the database. Data loading manager 125 may repeat these operations until unprocessed data for all of the remaining columns in the table of the database are processed.

An example operation of system 100 will now be described by reference to FIGS. 1-6. The example operation will demonstrate how data management system 115 independently loads related data into a database according to some embodiments. FIG. 2 illustrates an example database schema 200 according to some embodiments. Specifically, database schema 200 is provided by a user of client device 145 in this example. Upon receiving database schema 200, database manager 120 stores it in configuration data storage 140. Also, database manager 120 generates a database, which will be used for this example operation, based on database schema 200 and stores the database in database storage 135.

As depicted in FIG. 2, database schema 200 includes table definitions 205-215. Table definition 205 is for a Sales table that includes five columns: a Root ID column configured to store a unique identifier for identifying a record in the Sales table, a Date column configured to store a date a product is sold, an Amount column configured to store an amount for which the product is sold, a Product column configured to store a reference to information associated with the product sold, and a Store column configured to store a reference to information associated with the store at which the product is sold. Table definition 210 is for a Products table that includes three columns: a Root ID column configured to store a unique identifier for identifying a record in the Product table, a Product ID column configured to store a unique identifier for identifying a product, and a Product Name column configured to store a name of the product. Table definition 215 is for a Stores table that includes three columns: a Root ID column configured to store a unique identifier for identifying a record in the Stores table, a Store ID column configured to store a unique identifier for identifying a store, and a Store Name column configured to store a name of the store. In some embodiments, a table generated based on table definition 205 is referred to as a fact table and tables generated based on table definitions 210 and 215 are referred to as dimension tables.

In addition, database schema 200 includes two relationships 220 and 225. Relationship 220 specifies a relationship between the Root ID column in the Products table and the Product column in the Sales table. In some embodiments, relationship 220 may be implemented by defining the Root ID column in the Products table as a primary key and the Product column in the Sales table as a foreign key. Relationship 225 specifies a relationship between the Root ID column in the Stores table and the Store column in the Sales table. In some embodiments, relationship 225 may be implemented by defining the Root ID column in the Stores table as a primary key and the Store column in the Sales table as a foreign key.

In this example, table definition 210 includes a column definition for the Root ID column. The column definition defines how to generate a unique value for identifying a record in the Product table based on one or more values for one or more columns in table definition 210. In some embodiments, the column definition in table definition 210 specifies to use a hash function (e.g., a Secure Hash Algorithm 1 (SHA-1) hash function, a Secure Hash Algorithm 2 (SHA-2) hash function, a Message-Digest algorithm 5 (MD5) hash function, etc.) to generate the unique value. For this example, the one or more values for the one or more columns in table definition 210 are provided as input to the hash function. Next, the hash function generates an output value based on the input. The output of the hash function may be used as the value for the Root ID column in the Products table. In addition, table definition 215 also includes a column definition for the Root ID column. This column definition defines how to generate a unique value for identifying a record in the Stores table based on one or more values for one or more columns in table definition 215. In some embodiments, the column definition in table definition 215 specifies to use a hash function to generate the unique value. In this example, the one or more values of the one or more columns in table definition 215 is provided as input to the hash function. The hash function then generates an output value based on the input. The output of the hash function may be used as the value for the Root ID column in the Stores table. In some instances, the same hash function is used for both column definitions.

Referring back to FIG. 1, the example operation begins by data management system 115 receiving a set of data from one of the data sources 105a-n. In response to receiving the set of data, database manager 120 stores it in unprocessed data storage 130. FIG. 3 illustrates an example of unprocessed data 300 according to some embodiments. For this example, unprocessed data 300 is included in the set of data that data management system 115 receives from the one data source 105. As shown, unprocessed data 300 includes four attributes: a Date attribute, an Amount attribute, a Product attribute, and a Store attribute. Additionally, unprocessed data 300 includes record 305 that includes values for the four attributes: a value of "Jan. 1, 2022" for the Date attribute, a value of "$399" for the Amount attribute, a value of "Computer" for the Product attribute, and a value of "Acme, Inc." for the Store attribute.

Referring now to FIG. 4, an example products table 400 is shown according to some embodiments. Database manager 120 generates products table 400 for the database stored in database storage 135 in this example based on table definition 210 in database schema 200. As such, products table 400 includes three columns: a Root ID column configured to store a unique identifier for identifying a record in products table 400, a Product ID column configured to store a unique identifier for identifying a product, and a Product Name column configured to store a name of the product. Products table 400 includes record 405, which includes values for the three columns: a value of "ABC" for the Root ID column, a value of "7839" for the Product ID column, and a value of "Computer" for the Product Name column. As mentioned above, table definition 210 includes a column definition for the Root ID column, which defines how to generate a unique value for identifying a record in the Products table based on one or more values of one or more columns in table definition 210. In this example, the value of the Product Name column is used to generate the value for the Root ID column. In particular, the value of "Computer" for the Product Name column in record 405 is provided as input to a hash function, which generates an output value based on the input. The output value generated by the hash function ("ABC" in this example) is used as the value for the Root ID column in record 405.

Referring now to FIG. 5, an example stores table 500 is shown according to some embodiments. Database manager 120 generates stores table 500 for the database stored in database storage 135 in this example based on table definition 215 in database schema 200. Accordingly, stores table 500 includes three columns: a Root ID column configured to store a unique identifier for identifying a record in stores table 500, a Store ID column configured to store a unique identifier for identifying a store, and a Store Name column configured to store a name of the store. Stores table 500 includes record 505, which includes values for the three columns: a value of "DEF" for the Root ID column, a value of "463" for the Store ID column, and a value of "Acme, Inc." for the Store Name column. As explained above, table definition 215 includes a column definition for the Root ID column, which defines how to generate a unique value for identifying a record in the Stores table based on one or more values of one or more columns in table definition 215. For this example, the value of the Store Name column is used to generate the value for the Root ID column. Specifically, the value of "Acme. Inc." for the Store Name column in record 505 is provided as input to a hash function, which generates an output value based on the input. The output value generated by the hash function ("DEF" in this example) is used as the value for the Root ID column in record 505.

In this example, unprocessed data is processed in two loads: a first load where the Date attribute, the Amount attribute, and the Product attribute are processed and a second load where the Store attribute is processed. Continuing with the example, data loading manager 125 starts (e.g., at a defined interval, upon receiving the data from the data source 105, etc.) to process the set of data, which includes unprocessed data 300, received from the one data source 105. FIGS. 6A and 6B illustrate an example sales table 600 according to some embodiments. In particular, FIG. 6A illustrates sales table 600 after data loading manager 125 loads data from record 305 into sales table 600 in a first load. Database manager 120 generates sales table 600 for the database stored in database storage 135 in this example based on table definition 205 in database schema 200. Thus, sales table 600 includes five columns: a Root ID column configured to store a unique identifier for identifying a record in sales table 600, a Date column configured to store a date a product is sold, an Amount column configured to store an amount for which the product is sold, a Product column configured to store a reference to information associated with the product sold, and a Store column configured to store a reference to information associated with the store at which the product is sold.

In the first load, data loading manager 125 processes unprocessed data 300 by first generating record 605 in sales table 600 in the database. Then, data loading manager 125 generates a unique value (e.g., by incrementing the value in the last record in sales table 600 by one and using the incremented value) for record 605 and stores it in the Root ID column of sales table 600. Next, data loading manager 125 loads the value for the Date attribute in record 305 in the Date column of record 605 in sales table 600. Similarly, data loading manager 125 loads the value for the Amount attribute in record 305 in the Amount column of record 605 in sales table 600. To process the value of the Product attribute in record 305 for the Product column in sales table 600, data loading manager 125 determines that the Product column in sales table 600 is related to the Root ID column in products table 400 based on database schema 200. Next, data loading manager 125 uses the column definition specified for the Root ID column in table definition 210 to determine how to generate the value for the Product column of record 605. For this example, the column definition for the Root ID column in table definition 210 specifies to use a hash function. Therefore, data loading manager 125 provides the value for the Product attribute as input to the specified hash function. The hash function generates an output value ("ABC" in this example) based on the input. Data loading manager 125 uses the output value as the value for the Product column of record 605 in sales table 600 and, hence, stores the output value in the Product column of record 605. As shown in FIG. 6A, the value of the Product column in sales table 600 is the same as the value of the Root ID column in record 405. That is, the value of the Product column in record 605 in sales table 600 serves as a reference to record 405.

FIG. 6B illustrates sales table 600 after data loading manager 125 loads data from record 305 into sales table 600 in a second load. During the second load, data loading manager 125 processes the remaining Store attribute in record 305. Data loading manager 125 processes the value of the Store attribute in record 305 for Store column in sales table 600 by determining that the Store column in sales table 600 is related to the Root ID column in stores table 500 based on database schema 200. Data loading manager 125 then uses the column definition specified for the Root ID column in table definition 215 to determine how to generate the value for the Store column of record 605. In this example, the column definition for the Root ID column in table definition 215 specifies to use the same hash function as the one specified in the column definition for the Root ID column in table definition 210. As such, data loading manager 125 provides the value for the Store attribute as input to the hash function, which generates an output value ("DEF" in this example) based on the input. Data loading manager 125 uses the output value as the value for the Store column of record 605 in sales table 600 and stores the output value in the Store column of record 605. As depicted in FIG. 6B, the value of the Store column in sales table 600 is the same as the value of the Root ID column in record 505. As such, the value of the Store column in record 605 of sales table 600 serves as a reference to record 505.

The example described above shows that using a column definition to generate the values for the Root ID column in products table 400 and generate the values in the Product column in sales table 600 for referencing records in products table 400 allows data to be loaded in products table 400 and sales table 600 independently. Similarly, a column definition used to generate the values for the Root ID column in stores table 500 and generate the values in the Store column in sales table 600 for referencing records in stores table 500 allows data to be loaded in stores table 500 and sales table 600 independently. For example, unprocessed data 300 may be processed and loaded with valid values into sales table 600 even if record 405 is not yet created in products table 400 and/or record 505 is not yet created in stores table 500. This is because the values generated for record 605 that reference record 405 and record 505 do not depend on records 405 and 505 being present in product table 400 and stores table 500, respectively. Records 405 and 505 were already created in products table 400 and stores table 500 for the example operation. However, in cases where records 405 and 505 were not in products table 400 and stores table 500 data loading manager 125 can create records 405 and 505 for products table 400 and stores 500, respectively, in a separate load(s) configured to detect these missing records and create them for products table 400 and stores table 500 accordingly.

Figure 7:
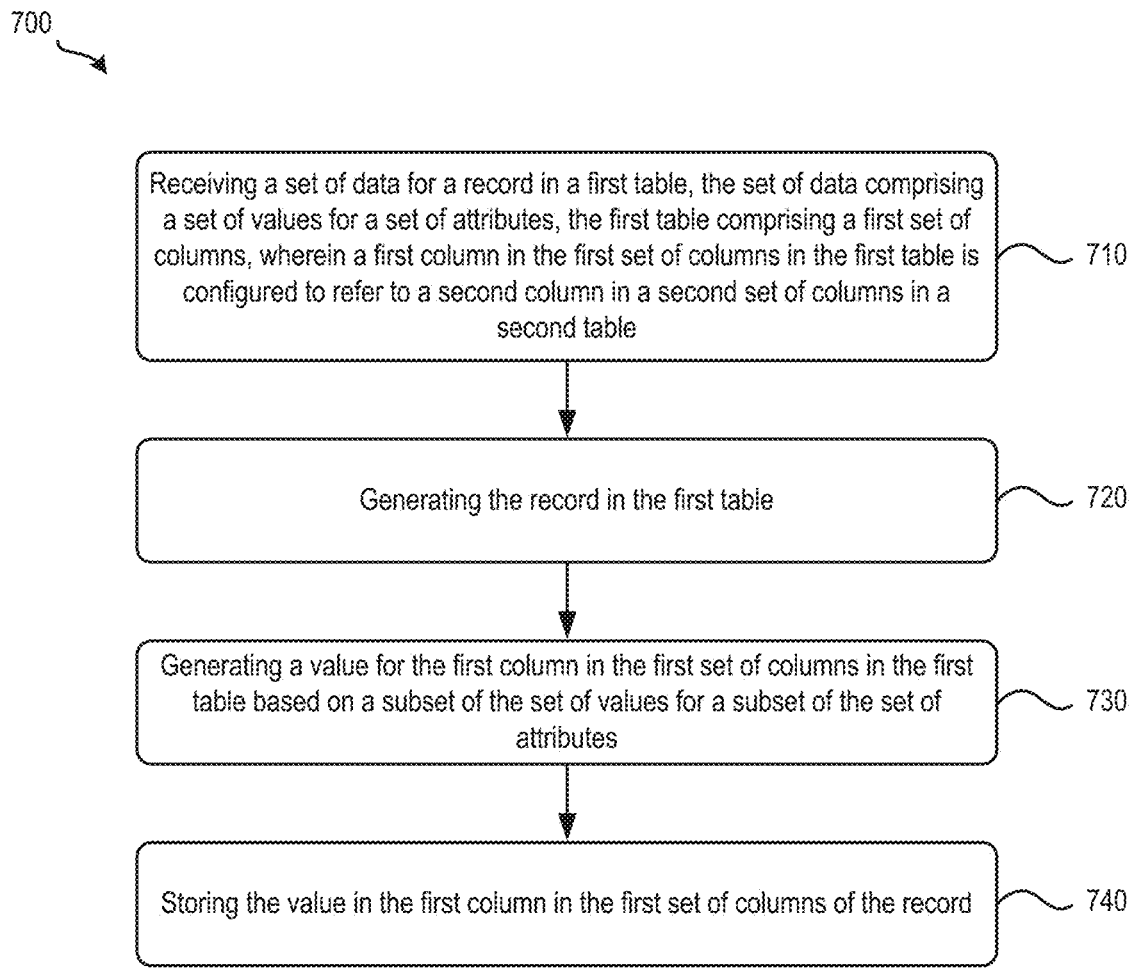
FIG. 7 illustrates a process for independently loading related data into data storages according to some embodiments.

FIG. 7 illustrates a process 700 for independently loading related data into data storages according to some embodiments. In some embodiments, data management system 115 performs process 700. Process 700 starts by receiving, at 710, a set of data for a record in a first table. The set of data comprises a set of values for a set of attributes. The first table comprises a first set of columns. A first column in the first set of columns in the first table is configured to refer to a second column in a second set of columns in a second table. Referring to FIGS. 1-4 and 6 as an example, data management system 115 receives unprocessed data 300 from one of the data sources 105. Unprocessed data 300 is for record 605 in sales table 600. The Product column in sales table 600 is related to the Root ID column in products table 400 based on database schema 200.

Next, process 700 generates, at 720, the record in the first table. Referring to FIGS. 1 and 6A as an example, data loading manager 125 generates record 605 in sales table 600 in a first load where the Date attribute, the Amount attribute, and the Product attribute are processed.

Then, process 700 generates, at 730, a value for the first column in the first set of columns in the first table based on a subset of the set of values for a subset of the set of attributes. Referring to FIGS. 1, 3, and 6A as an example, data loading manager 1253 processes the value for the Product attribute in record 305 by determining that the Product column in sales table 600 is related to the Root ID column in products table 400 based on database schema 200 and using the column definition specified for the Root ID column in table definition 210 to determine how to generate the value for the Product column of record 605. For instance, the column definition for the Root ID column in table definition 210 specifies to use a hash function. As such, data loading manager 125 provides the value for the Product attribute in record 305 as input to the specified hash function. The hash function generates an output value based on the input.

Finally, process 700 stores, at 740, the value in the first column in the first set of columns of the record. Referring to FIGS. 1, 4, and 6A as an example, data loading manager 125 uses the output value generated by the hash function as the value for the Product column of record 605 in sales table 600. Accordingly, data loading manager 125 stores the output value in the Product column of record 605. As shown in FIG. 6A, the value of the Product column in sales table 600 is the same as the value of the Root ID column in record 405. Thus, the value of the Product column in record 605 of sales table 600 serves as a reference to record 405.

As mentioned above, techniques are described herein for determining references to predefined types of records. Some advantages of these techniques for determining references to predefined types of records relate to reporting. For instance, in some data-warehousing systems, facts and dimensions may be the two main tables that are used to provide meaningful data to end-users to extract business value and patterns. Facts are quantitative and describe events like a purchase or a payment or an invoice etc. These facts are supported by multiple dimensions which provide context and describe the facts better. Fact records are usually denormalized (e.g., they have a flat structure of data and contain information from several transactional or source tables). This leads to a fact record containing several references to dimensions through foreign key references. A fact record can require multiple data loads to fully populate the fact record. Each data load populates a subset of columns in the fact record. So when a fact record has been processed by some but not all of the data loads, the fact record does not have valid references for other dimensions that are to be populated by the remaining data loads. This leaves several dimension references as null. When a report is generated based on these types of partially processed fact records, it may not make sense to the end-user and likely confuses the end-user about the completeness of the record data. Determining references to predefined types of records, such as a null record, allows the end-user to make better sense of unprocessed data in reports.

Another example operation of system 100 will now be described by reference to FIGS. 1-3 and 8-13. This example operation will show how data management system 115 determines references to predefined types of records according to some embodiments. Similar to the previous example operation, the database that database manager 120 generated based on database schema 200 will be used for this example operation. The example operation begins by data management system 115 receiving a set of data from one of the data sources 105a-n. In response to receiving the set of data, database manager 120 stores the set of data in unprocessed data storage 130. In this example, unprocessed data 300 is included in the set of data that data management system 115 receives from the one data source 105.

For this example, database manager 120 generates predefined types of records in dimension tables (e.g., tables generated based table definitions 210 and 215) when database manager 120 generates the database based on database schema 200. One type of predefined record is a null record. In some embodiments, a null record is a record in a table that has null values in the columns of the record. Referring now to FIG. 8, another example products table 800 is shown according to some embodiments. In this example, database manager 120 generates products table 800 based on table definition 210 in database schema 200 when database manager 120 generates the database in this example. As shown, products table 800 includes three columns: a Root ID column configured to store a unique identifier for identifying a record in products table 800, a Product ID column configured to store a unique identifier for identifying a product, and a Product Name column configured to store a name of the product. As part of the process of generating products table 800, database manager 120 generates predefined null record 805. Database manager 120 stores a defined value (e.g., an empty value, a null value, a value of 0, etc.) in the Product ID column and the Product Name column. Database manager 120 generates the value for the Root ID column of record 805 in the products table 800 based on the column definition specified for table definition 210. In particular, database manager 120 provides the value for the Product Name column in record 805 as input to a hash function, which generates an output value based on the input. The output value generated by the hash function ("GHI" in this example) is used as the value for the Root ID column in record 805.

Referring now to FIG. 9, an example stores table 900 is shown according to some embodiments. For this example, database manager 120 generates stores table 900 based on table definition 215 in database schema 200 when database manager 120 generates the database in this example. Accordingly, stores table 900 includes three columns: a Root ID column configured to store a unique identifier for identifying a record in stores table 900, a Store ID column configured to store a unique identifier for identifying a store, and a Store Name column configured to store a name of the store. As part of the process of generating products table 900, database manager 120 generates predefined record 905. Database manager 120 stores a defined value (e.g., an empty value, a null value, a value of 0, etc.) in the Store ID column and the Store Name column. Database manager 120 generates the value for the Root ID column of predefined record 905 in the stores table 900 based on the column definition specified for table definition 215. Specifically, database manager 120 provides the value for the Store Name column in predefined record 905 as input to a hash function, which generates an output value based on the input. The output value generated by the hash function ("JKL" in this example) is used as the value for the Root ID column in predefined record 905.

Figure 10:
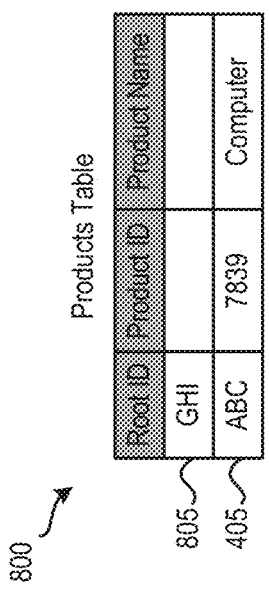
FIG. 10 illustrates the products table illustrated in FIG. 8 after a record is added according to some embodiments.
Figure 11:
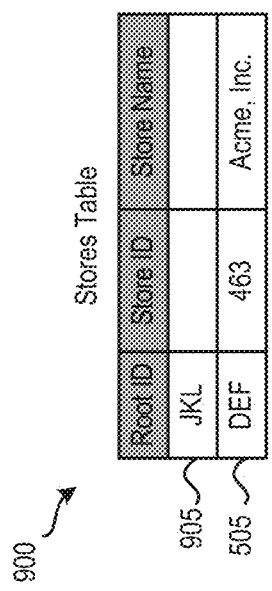
FIG. 11 illustrates the stores table illustrated in FIG. 9 after a record is added according to some embodiments.

At some point after database manage 120 generates the database that includes products table 800 and stores table 900, data loading manager 125 adds records 405 and 505 to products table 800 and stores table 900, respectively (e.g., via load(s) configured to detect missing records and create them for products table 400 and stores table 500, as mentioned above). FIG. 10 illustrates products table 800 after a record is added according to some embodiments. In particular, FIG. 10 depicts products table 800 after data loading manager 125 adds record 405 to products table 800. FIG. 11 illustrates stores table 900 after a record is added according to some embodiments. Specifically, FIG. 11 shows stores table 900 after data loading manager 125 adds record 505 to stores table 900.

Similar to the previous example operation, unprocessed data is processed in this operation in two loads: a first load where the Date attribute, the Amount attribute, and the Product attribute are processed and a second load where the Store attribute is processed. Continuing with the example, data loading manager 125 begins (e.g., at a defined interval, upon receiving the data from the data source 105, etc.) to process the set of data, which includes unprocessed data 300, received from the one data source 105. FIGS. 12A and 12B illustrate another example sales table 1200 according to some embodiments. FIG. 12A illustrates sales table 1200 after data loading manager 125 loads data from record 305 into sales table 1200 in a first load. Database manager 120 generates sales table 1200 for the database stored in database storage 135 in this example based on table definition 205 in database schema 200. As such, sales table 1200 includes five columns: a Root ID column configured to store a unique identifier for identifying a record in sales table 1200, a Date column configured to store a date a product is sold, an Amount column configured to store an amount for which the product is sold, a Product column configured to store a reference to information associated with the product sold, and a Store column configured to store a reference to information associated with the store at which the product is sold.

In the first load, data loading manager 125 processes unprocessed data 300 by first generating record 1205 in sales table 1200 in the database. Next, data loading manager 125 generates a unique value (e.g., by incrementing the value in the last record in sales table 1200 by one and using the incremented value) for record 1205 and stores it in the Root ID column of record 1205 in sales table 1200. Data loading manager 125 then loads the value for the Date attribute in record 305 in the Date column of record 1205 in sales table 1200. Similarly, data loading manager 125 loads the value for the Amount attribute in record 305 in the Amount column of record 1205 in sales table 1200. To process the value of the Product attribute in record 305 for the Product column in sales table 1200, data loading manager 125 determines that the Product column in sales table 1200 is related to the Root ID column in products table 800 based on database schema 200. Then, data loading manager 125 uses the column definition specified for the Root ID column in table definition 210 to determine how to generate the value for the Product column of record 1205. In this example, the column definition for the Root ID column in table definition 210 specifies to use a hash function. Accordingly, data loading manager 125 provides the value for the Product attribute as input to the specified hash function. The hash function generates an output value ("ABC" in this example) based on the input. Data loading manager 125 uses the output value as the value for the Product column of record 1205 in sales table 1200 and, thus, stores the output value in the Product column of record 1205. As illustrated in FIG. 12A, the value of the Product column in sales table 1200 is the same as the value of the Root ID column in record 405 of products table 800. Hence, the value of the Product column in record 1205 of sales table 1200 serves as a reference to record 405 in products table 800.

In the first load, data loading manager 125 also determines references to predefined types of records for columns in sales table 1200 for which the first load is not configured to process unprocessed data. For each such a column that data loading manager 125 detects, data loading manager 125 determines whether the column is related to another column in another table based on the database schema of the database. If so, data loading manager 125 determines a reference to a predefined type of record based on the column definition specified for the other column in the other table. For instance, in this example, data loading manager 125 detects that the Store column in sales table 1200 is a column for which the first load is not configured to process unprocessed data. Next, data loading manager 125 determines that the Product column in sales table 1200 is related to the Root ID column in stores table 900 based on database schema 200. Data loading manager 125 then uses the column definition specified for the Root ID column in table definition 215 to determine how to generate the value for the Store column of record 1205. Since data loading manager 125 does not have a value for the Store column, data loading manager 125 uses the defined value (e.g., an empty value, a null value, a value of 0, etc.) that is configured to be stored in the Store column of the predefined record 905 and provides the defined value as input to a hash function, which generates an output value based on the input. The output value generated by the hash function ("JKL" in this example) is used as the value for the Root ID column in record 905. Data loading manager 125 uses the output value as the value for the Store column of record 1205 in sales table 1200 and, therefore, stores the output value in the Store column of record 1205. As depicted in FIG. 12A, the value of the Store column in record 1205 of sales table 1200 is the same as the value of the Root ID column in record 905. Accordingly, the value of the Store column in record 1205 in sales table 1200 serves as a reference to record 905.

FIG. 12B illustrates sales table 1200 after data loading manager 125 loads data from record 305 into sales table 1200 in a second load. During the second load, data loading manager 125 processes the remaining Store attribute in record 305. Data loading manager 125 processes the value of the Store attribute in record 305 for Store column in sales table 1200 by determining that the Store column in sales table 1200 is related to the Root ID column in stores table 500 based on database schema 200. Data loading manager 125 then uses the column definition specified for the Root ID column in table definition 215 to determine how to generate the value for the Store column of record 1205. In this example, the column definition for the Root ID column in table definition 215 specifies to use the same hash function as the one specified in the column definition for the Root ID column in table definition 210. As such, data loading manager 125 provides the value for the Store attribute as input to the hash function, which generates an output value ("DEF" in this example) based on the input. Data loading manager 125 uses the output value as the value for the Store column of sales table 1200 and replaces the "JKL" value with the output value in the Store column of record 1205. As depicted in FIG. 12B, the value of the Store column in sales table 1200 is the same as the value of the Root ID column in record 505. As such, the value of the Store column in sales table 1200 serves as a reference to record 505 in stores table 900.

The example operation described above illustrates how data management system 115 determines references to predefined types of records. Some of the many advantages of this feature is for reporting purposes. For instance, when data management system 115 receives a request (e.g., from client device 145) for a report that includes data from sales table 1200 and the request is received after the first load but before the second load, data management system 115 can detect (e.g., during a join between sales table 1200 and stores table 900) that record 1205 refers to a predefined record in the stores table 900. Data management system 115 can annotate the Stores column of record 1205 (e.g., "unprocessed data", "unclassified data", etc.) to indicate that data for that column is not yet processed. Without this feature, the Store column may be ambiguously blank or record 1205 may not even make it into the report for lack of completeness.

Figure 13:
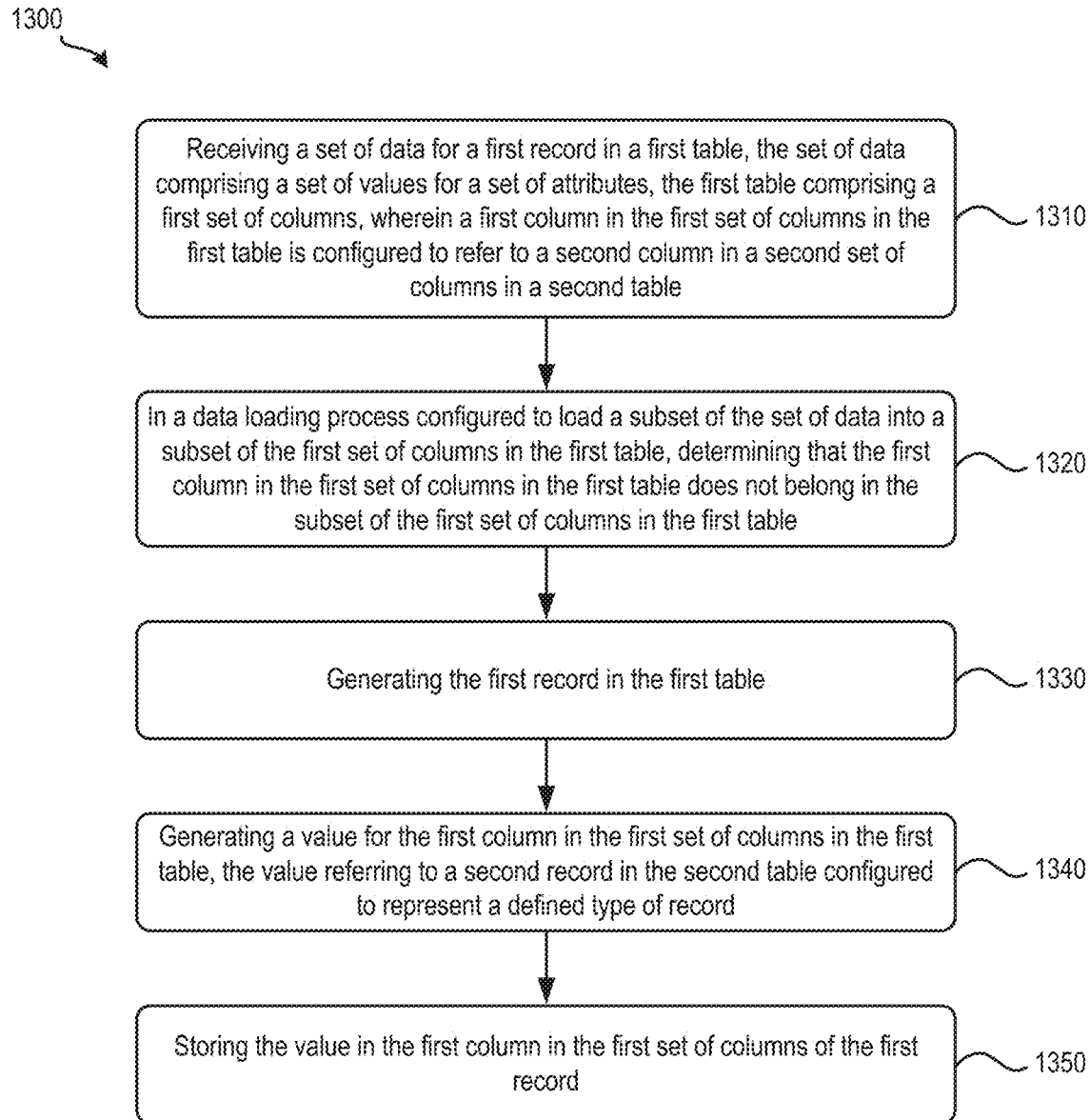
FIG. 13 illustrates a process for determining references to predefined types of records according to some embodiments.

FIG. 13 illustrates a process 1300 for determining references to predefined types of records according to some embodiments. In some embodiments, data management system 115 performs process 1300. Process 1300 starts by receiving, at 1310, a set of data for a first record in a first table. The set of data comprises a set of values for a set of attributes. The first table comprises a first set of columns. A first column in the first set of columns in the first table is configured to refer to a second column in a second set of columns in a second table. Referring to FIGS. 1-3, 8, and 12 as an example, data management system 115 receives unprocessed data 300 from one of the data sources 105. Unprocessed data 300 is for record 1205 in sales table 1200. The Product column in sales table 1200 is related to the Root ID column in products table 800 based on database schema 200.

In a data loading process configured to load a subset of the set of data into a subset of the first set of columns in the first table, process 1300 determines, at 1320, that the first column in the first set of columns in the first table does not belong in the subset of the first set of columns in the first table. Referring to FIGS. 1, 3, and 12A as an example, data loading manager 125 determines that the Store column in sales table 1200 is a column for which the first load is not configured to process unprocessed data. That is, the first load is configured to process the Date attribute, the Amount attribute, and the Product attribute in unprocessed data 300 for the Data column, the Amount column, and the Product column in sales table 1200. Hence, data loading manager 125 determines that the Store column in sales table 1200 is not a column for which the first load is configured to process unprocessed data 300.

Next, process 1300 generates, at 1330, the first record in the first table. Referring to FIGS. 1 and 12A as an example, data loading manager 125 generates record 1205 for sale table 1200. Process 1300 then generates, at 1340, a value for the first column in the first set of columns in the first table. The value refers to a second record in the second table configured to represent a defined type of record. Referring to FIGS. 1-3, 9, and 12A as an example, data loading manager 125 determines that the Product column in sales table 1200 is related to the Root ID column in stores table 90 based on database schema 200. As such, data loading manager 125 uses the column definition specified for the Root ID column in table definition 215 to determine how to generate the value for the Store column of record 1205. Because data loading manager 125 does not have a value for the Store column, data loading manager 125 uses the defined value (e.g., an empty value, a null value, a value of 0, etc.) that is configured to be stored in the Store column of the predefined record 905 and provides the defined value as input to a hash function, which generates an output value based on the input. The output value generated by the hash function ("JKL" in this example) is used as the value for the Root ID column in record 905.

Finally, process 1300 stores, at 1350, the value in the first column in the first set of columns of the first record. Referring to FIGS. 1 and 12A as an example, data loading manager 125 uses the output value generated by the hash function as the value for the Store column of record 1205 in sales table 1200. Accordingly, data loading manager 125 stores the output value in the Store column of record 1205. As shown in FIG. 12A, the value of the Store column in record 1205 of sales table 1200 is the same as the value of the Root ID column in record 905. Accordingly, the value of the Store column in record 1205 in sales table 1200 serves as a reference to record 905.

Figure 14:
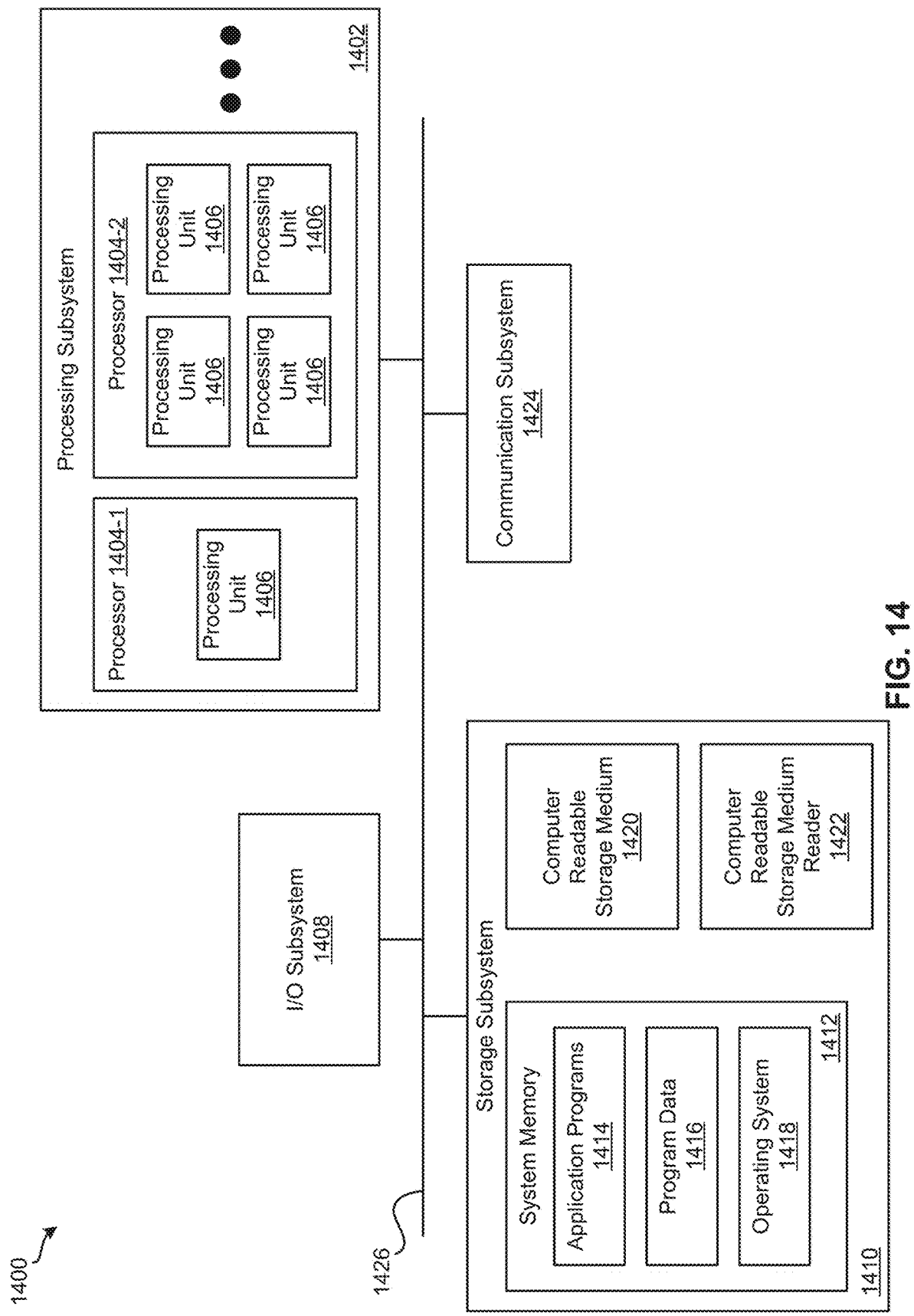
FIG. 14 illustrates an exemplary computer system, in which various embodiments may be implemented.

FIG. 14 illustrates an exemplary computer system 1400 for implementing various embodiments described above. For example, computer system 1400 may be used to implement data sources 105a-n, data management system 115, and client device 145. Computer system 1400 may be a desktop computer, a laptop, a server computer, or any other type of computer system or combination thereof. Some or all elements of database manager 120, data loading manager 125, or combinations thereof can be included or implemented in computer system 1400. In addition, computer system 1400 can implement many of the operations, methods, and/or processes described above (e.g., process 700 and process 1300). As shown in FIG. 14, computer system 1400 includes processing subsystem 1402, which communicates, via bus subsystem 1426, with input/output (I/O) subsystem 1408, storage subsystem 1410 and communication subsystem 1424.

Bus subsystem 1426 is configured to facilitate communication among the various components and subsystems of computer system 1400. While bus subsystem 1426 is illustrated in FIG. 14 as a single bus, one of ordinary skill in the art will understand that bus subsystem 1426 may be implemented as multiple buses. Bus subsystem 1426 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 1402, which can be implemented as one or more integrated circuits (e.g., a conventional microprocessor or microcontroller), controls the operation of computer system 1400. Processing subsystem 1402 may include one or more processors 1404. Each processor 1404 may include one processing unit 1406 (e.g., a single core processor such as processor 1404-1) or several processing units 1406 (e.g., a multicore processor such as processor 1404-2). In some embodiments, processors 1404 of processing subsystem 1402 may be implemented as independent processors while, in other embodiments, processors 1404 of processing subsystem 1402 may be implemented as multiple processors integrate into a single chip or multiple chips. Still, in some embodiments, processors 1404 of processing subsystem 1402 may be implemented as a combination of independent processors and multiple processors integrated into a single chip or multiple chips.

In some embodiments, processing subsystem 1402 can execute a variety of programs or processes in response to program code and can maintain multiple concurrently executing programs or processes. At any given time, some or all of the program code to be executed can reside in processing subsystem 1402 and/or in storage subsystem 1410. Through suitable programming, processing subsystem 1402 can provide various functionalities, such as the functionalities described above by reference to process 700, process 1300, etc.

I/O subsystem 1408 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1400 to a user or another device (e.g., a printer).

As illustrated in FIG. 14, storage subsystem 1410 includes system memory 1412, computer-readable storage medium 1420, and computer-readable storage medium reader 1422. System memory 1412 may be configured to store software in the form of program instructions that are loadable and executable by processing subsystem 1402 as well as data generated during the execution of program instructions. In some embodiments, system memory 1412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1412 may include different types of memory, such as static random access memory (SRAM) and/or dynamic random access memory (DRAM). System memory 1412 may include a basic input/output system (BIOS), in some embodiments, that is configured to store basic routines to facilitate transferring information between elements within computer system 1400 (e.g., during start-up). Such a BIOS may be stored in ROM (e.g., a ROM chip), flash memory, or any other type of memory that may be configured to store the BIOS.

As shown in FIG. 14, system memory 1412 includes application programs 1414, program data 1416, and operating system (OS) 1418. OS 1418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1420 may be a non-transitory computer-readable medium configured to store software (e.g., programs, code modules, data constructs, instructions, etc.). Many of the components (e.g., database manager 120 and data loading manager 125) and/or processes (e.g., process 700 and process 1300) described above may be implemented as software that when executed by a processor or processing unit (e.g., a processor or processing unit of processing subsystem 1402) performs the operations of such components and/or processes. Storage subsystem 1410 may also store data used for, or generated during, the execution of the software.

Storage subsystem 1410 may also include computer-readable storage medium reader 1422 that is configured to communicate with computer-readable storage medium 1420. Together and, optionally, in combination with system memory 1412, computer-readable storage medium 1420 may comprehensively represent remote, local, fixed, and/or removable storage devices plus storage media for temporarily and/or more permanently containing, storing, transmitting, and retrieving computer-readable information.

Computer-readable storage medium 1420 may be any appropriate media known or used in the art, including storage media such as volatile, non-volatile, removable, non-removable media implemented in any method or technology for storage and/or transmission of information. Examples of such storage media includes RAM. ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 1424 serves as an interface for receiving data from, and transmitting data to, other devices, computer systems, and networks. For example, communication subsystem 1424 may allow computer system 1400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1424 may provide components configured for wired communication (e.g., Ethernet) in addition to or instead of components configured for wireless communication.

One of ordinary skill in the art will realize that the architecture shown in FIG. 14 is only an example architecture of computer system 1400, and that computer system 1400 may have additional or fewer components than shown, or a different configuration of components. The various components shown in FIG. 14 may be implemented in hardware, software, firmware or any combination thereof, including one or more signal processing and/or application specific integrated circuits.

Figure 15:
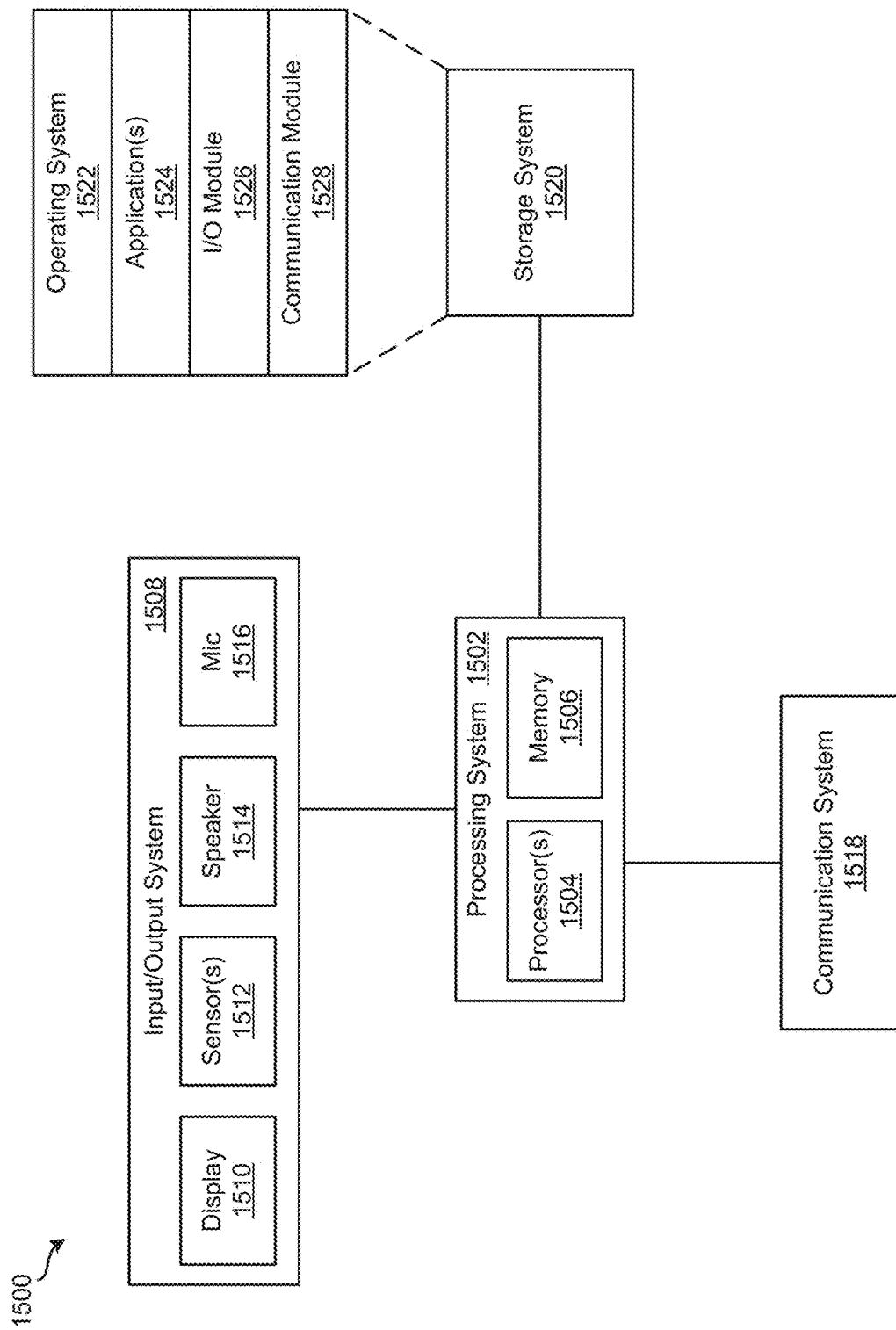
FIG. 15 illustrates an exemplary computing device, in which various embodiments may be implemented.

FIG. 15 illustrates an exemplary computing device 1500 for implementing various embodiments described above. For example, computing device 1500 may be used to implement data sources 105a-n and client device 145. Computing device 1500 may be a cellphone, a smartphone, a wearable device, an activity tracker or manager, a tablet, a personal digital assistant (PDA), a media player, or any other type of mobile computing device or combination thereof. As shown in FIG. 15, computing device 1500 includes processing system 1502, input/output (I/O) system 1508, communication system 1518, and storage system 1520. These components may be coupled by one or more communication buses or signal lines.

Processing system 1502, which can be implemented as one or more integrated circuits (e.g., a conventional microprocessor or microcontroller), controls the operation of computing device 1500. As shown, processing system 1502 includes one or more processors 1504 and memory 1506. Processors 1504 are configured to run or execute various software and/or sets of instructions stored in memory 1506 to perform various functions for computing device 1500 and to process data.

Each processor of processors 1504 may include one processing unit (e.g., a single core processor) or several processing units (e.g., a multicore processor). In some embodiments, processors 1504 of processing system 1502 may be implemented as independent processors while, in other embodiments, processors 1504 of processing system 1502 may be implemented as multiple processors integrated into a single chip. Still, in some embodiments, processors 1504 of processing system 1502 may be implemented as a combination of independent processors and multiple processors integrated into a single chip.

Memory 1506 may be configured to receive and store software (e.g., operating system 1522, applications 1524, I/O module 1526, communication module 1528, etc. from storage system 1520) in the form of program instructions that are loadable and executable by processors 1504 as well as data generated during the execution of program instructions. In some embodiments, memory 1506 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1508 is responsible for receiving input through various components and providing output through various components. As shown for this example, I/O system 1508 includes display 1510, one or more sensors 1512, speaker 1514, and microphone 1516. Display 1510 is configured to output visual information (e.g., a graphical user interface (GUI) generated and/or rendered by processors 1504). In some embodiments, display 1510 is a touch screen that is configured to also receive touch-based input. Display 1510 may be implemented using liquid crystal display (LCD) technology, light-emitting diode (LED) technology, organic LED (OLED) technology, organic electro luminescence (OEL) technology, or any other type of display technologies. Sensors 1512 may include any number of different types of sensors for measuring a physical quantity (e.g., temperature, force, pressure, acceleration, orientation, light, radiation, etc.). Speaker 1514 is configured to output audio information and microphone 1516 is configured to receive audio input. One of ordinary skill in the art will appreciate that I/O system 1508 may include any number of additional, fewer, and/or different components. For instance, I/O system 1508 may include a keypad or keyboard for receiving input, a port for transmitting data, receiving data and/or power, and/or communicating with another device or component, an image capture component for capturing photos and/or videos, etc.

Communication system 1518 serves as an interface for receiving data from, and transmitting data to, other devices, computer systems, and networks. For example, communication system 1518 may allow computing device 1500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1518 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1518 may provide components configured for wired communication (e.g., Ethernet) in addition to or instead of components configured for wireless communication.

Storage system 1520 handles the storage and management of data for computing device 1500. Storage system 1520 may be implemented by one or more non-transitory machine-readable mediums that are configured to store software (e.g., programs, code modules, data constructs, instructions, etc.) and store data used for, or generated during, the execution of the software.

In this example, storage system 1520 includes operating system 1522, one or more applications 1524, I/O module 1526, and communication module 1528. Operating system 1522 includes various procedures, sets of instructions, software components and/or drivers for controlling and managing general system tasks (e.g., memory management, storage device control, power management, etc.) and facilitates communication between various hardware and software components. Operating system 1522 may be one of various versions of Microsoft Windows, Apple Mac OS, Apple OS X. Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile. Android, BlackBerry OS. Blackberry 10, and Palm OS, WebOS operating systems.

Applications 1524 can include any number of different applications installed on computing device 1500. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1526 manages information received via input components (e.g., display 1510, sensors 1512, and microphone 1516) and information to be outputted via output components (e.g., display 1510 and speaker 1514). Communication module 1528 facilitates communication with other devices via communication system 1518 and includes various software components for handling data received from communication system 1518.

One of ordinary skill in the art will realize that the architecture shown in FIG. 15 is only an example architecture of computing device 1500, and that computing device 1500 may have additional or fewer components than shown, or a different configuration of components. The various components shown in FIG. 15 may be implemented in hardware, software, firmware or any combination thereof, including one or more signal processing and/or application specific integrated circuits.

Figure 16:
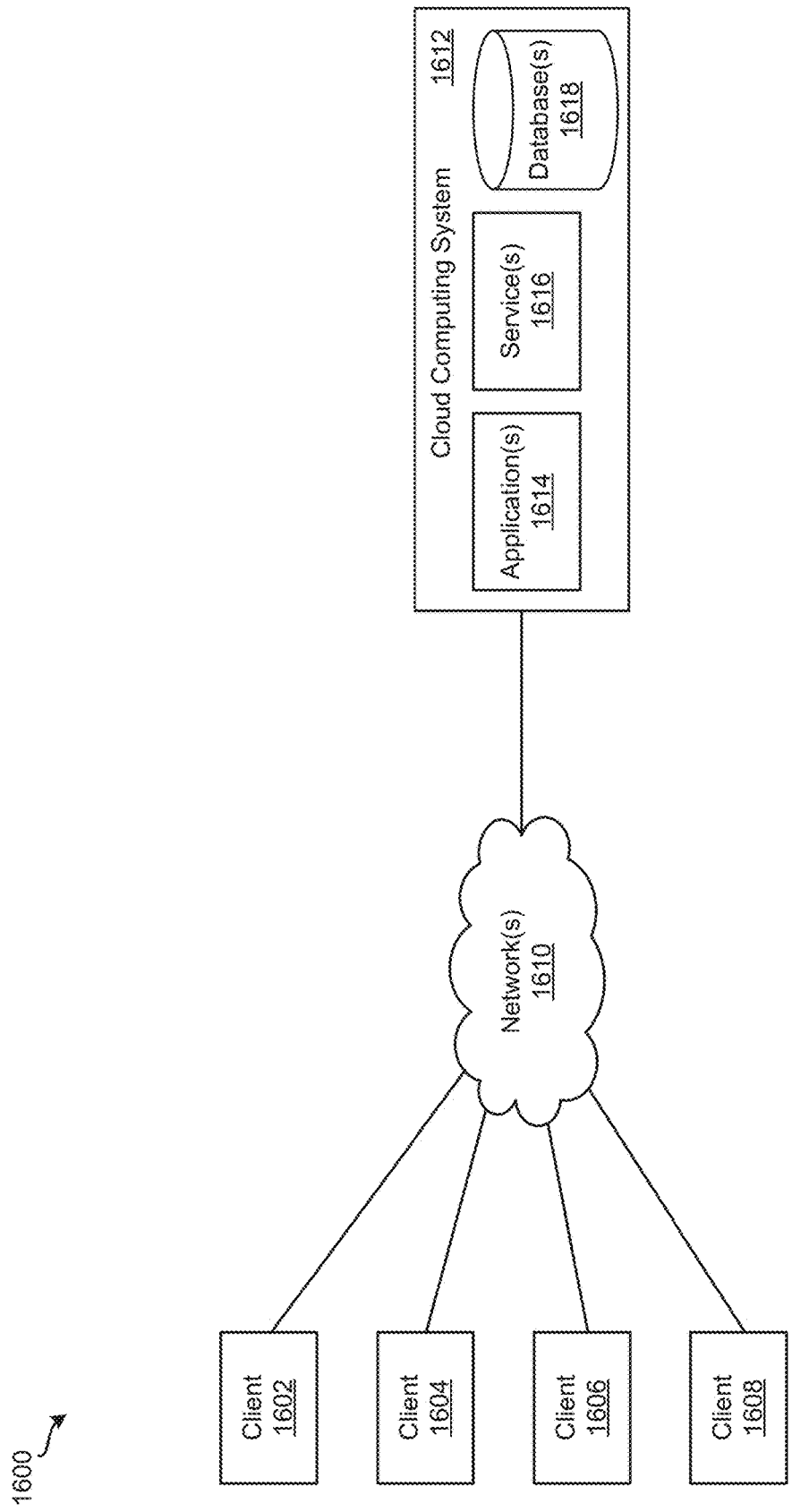
FIG. 16 illustrates an exemplary system, in which various embodiments may be implemented.

FIG. 16 illustrates an exemplary system 1600 for implementing various embodiments described above. For example, client devices 1602-1608 may be used to implement data sources 105*a-n* and client device 145 and cloud computing system 1612 may be used to implement data management system 115. As shown, system 1600 includes client devices 1602-1608, one or more networks 1610, and cloud computing system 1612. Cloud computing system 1612 is configured to provide resources and data to client devices 1602-1608 via networks 1610. In some embodiments, cloud computing system 1612 provides resources to any number of different users (e.g., customers, tenants, organizations, etc.). Cloud computing system 1612 may be implemented by one or more computer systems (e.g., servers), virtual machines operating on a computer system, or a combination thereof.

As shown, cloud computing system 1612 includes one or more applications 1614, one or more services 1616, and one or more databases 1618. Cloud computing system 1612 may provide applications 1614, services 1616, and databases 1618 to any number of different customers in a self-service, subscription-based, elastically scalable, reliable, highly available, and secure manner.

In some embodiments, cloud computing system 1612 may be adapted to automatically provision, manage, and track a customer's subscriptions to services offered by cloud computing system 1612. Cloud computing system 1612 may provide cloud services via different deployment models. For example, cloud services may be provided under a public cloud model in which cloud computing system 1612 is owned by an organization selling cloud services and the cloud services are made available to the general public or different industry enterprises. As another example, cloud services may be provided under a private cloud model in which cloud computing system 1612 is operated solely for a single organization and may provide cloud services for one or more entities within the organization. The cloud services may also be provided under a community cloud model in which cloud computing system 1612 and the cloud services provided by cloud computing system 1612 are shared by several organizations in a related community. The cloud services may also be provided under a hybrid cloud model, which is a combination of two or more of the aforementioned different models.

In some instances, any one of applications 1614, services 1616, and databases 1618 made available to client devices 1602-1608 via networks 1610 from cloud computing system 1612 is referred to as a "cloud service." Typically, servers and systems that make up cloud computing system 1612 are different from the on-premises servers and systems of a customer. For example, cloud computing system 1612 may host an application and a user of one of client devices 1602-1608 may order and use the application via networks 1610.

Applications 1614 may include software applications that are configured to execute on cloud computing system 1612 (e.g., a computer system or a virtual machine operating on a computer system) and be accessed, controlled, managed, etc. via client devices 1602-1608. In some embodiments, applications 1614 may include server applications and/or mid-tier applications (e.g., HTTP (hypertext transfer protocol) server applications, FTP (file transfer protocol) server applications, CGI (common gateway interface) server applications, JAVA server applications, etc.). Services 1616 are software components, modules, application, etc. that are configured to execute on cloud computing system 1612 and provide functionalities to client devices 1602-1608 via networks 1610. Services 1616 may be web-based services or on-demand cloud services.

Databases 1618 are configured to store and/or manage data that is accessed by applications 1614, services 1616, and/or client devices 1602-1608. For instance, storages 130-140 may be stored in databases 1618. Databases 1618 may reside on a non-transitory storage medium local to (and/or resident in) cloud computing system 1612, in a storage-area network (SAN), on a non-transitory storage medium local located remotely from cloud computing system 1612. In some embodiments, databases 1618 may include relational databases that are managed by a relational database management system (RDBMS). Databases 1618 may be a column-oriented databases, row-oriented databases, or a combination thereof. In some embodiments, some or all of databases 1618 are in-memory databases. That is, in some such embodiments, data for databases 1618 are stored and managed in memory (e.g., random access memory (RAM)).

Client devices 1602-1608 are configured to execute and operate a client application (e.g., a web browser, a proprietary client application, etc.) that communicates with applications 1614, services 1616, and/or databases 1618 via networks 1610. This way, client devices 1602-1608 may access the various functionalities provided by applications 1614, services 1616, and databases 1618 while applications 1614, services 1616, and databases 1618 are operating (e.g., hosted) on cloud computing system 1612. Client devices 1602-1608 may be computer system 1400 or computing device 1500, as described above by reference to FIGS. 14 and 15, respectively. Although system 1600 is shown with four client devices, any number of client devices may be supported.

Networks 1610 may be any type of network configured to facilitate data communications among client devices 1602-1608 and cloud computing system 1612 using any of a variety of network protocols. Networks 1610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving a set of data for a first record in a first table, the set of data comprising a set of values for a set of attributes, the first table comprising a first set of columns, wherein a first column in the first set of columns in the first table is configured to refer to a second column in a second set of columns in a second table;
   in a first data loading process configured to load a subset of the set of data into a subset of the first set of columns in the first table, determining that the first column in the first set of columns in the first table does not belong in the subset of the first set of columns in the first table;
   generating the first record in the first table;
   generating a value for the first column in the first set of columns in the first table, the value referring to a second predefined record in the second table, wherein the second predefined record serves as a placeholder record referenced by the first column in the first table until a second data loading process configured to load data for the first column in the first table is performed; and
   storing the value in the first column in the first set of columns of the first record.

2. The non-transitory machine-readable medium of claim 1, wherein the set of data is a first set of data comprising a first set of values for a first set of attributes, wherein the data load process is a first data load process, wherein the subset of the first set of columns in the first table is a first subset of the first set of columns in the first table, wherein the value is a first value, wherein the program further comprises sets of instructions for:
   receiving a second set of data for the first record in the first table, the second set of data comprising a second set of values for a second set of attributes;
   in the second data loading process configured to load a subset of the second set of data into a second subset of the first set of columns in the first table, determining that the first column in the first set of columns in the first table belongs in the second subset of the first set of columns in the first table;
   generating a second value for the first column in the first set of columns in the first table based on a subset of the second set of values for a subset of the second set of attributes; and
   replacing the first value with the second value in the first column in the first set of columns of the first record.

3. The non-transitory machine-readable medium of claim 1, wherein a third column in the first set of columns in the first table is configured to refer to a fourth column in a third set of columns in a third table, wherein the value is a first value, wherein the program further comprises sets of instructions for:
   in the first data loading process, determining that the third column in the first set of columns in the first table belongs in the subset of the first set of columns in the first table;
   generating a second value for the third column in the first set of columns in the first table based on a subset of the set of values for a subset of the set of attributes, the second value referring to a third record in the third table, the third record comprising the subset of the set of values for the subset of the set of attributes; and
   storing the second value in the third column in the first set of columns of the first record.

4. The non-transitory machine-readable medium of claim 3, wherein generating the second value comprises:
   providing the subset of the set of values for the subset of the set of attributes as inputs to a hash function, wherein the hash function is configured to generate an output based on the subset of the set of values for the subset of the set of attributes; and
   using the output as the second value.

5. The non-transitory machine-readable medium of claim 1, wherein the program further comprises a set of instructions for generating the second record in the second table.

6. The non-transitory machine-readable medium of claim 1, wherein the second column in the second set of columns in the second table is configured to store unique values for identifying unique records in the second table, wherein the program further comprises a set of instructions for receiving a column definition for the second column in the second set of columns in the second table, the column definition specifying to generate a unique value for each record in the second table based on values for a subset of the second set of columns in the second table.

7. The non-transitory machine-readable medium of claim 6, wherein generating the value is based on the column definition for the second column in the second set of columns in the second table.

8. A method comprising:
   receiving a set of data for a first record in a first table, the set of data comprising a set of values for a set of attributes, the first table comprising a first set of columns, wherein a first column in the first set of columns in the first table is configured to refer to a second column in a second set of columns in a second table;

in a first data loading process configured to load a subset of the set of data into a subset of the first set of columns in the first table, determining that the first column in the first set of columns in the first table does not belong in the subset of the first set of columns in the first table;

generating the first record in the first table;

generating a value for the first column in the first set of columns in the first table, the value referring to a second predefined record in the second table, wherein the second predefined record serves as a placeholder record referenced by the first column in the first table until a second data loading process configured to load data for the first column in the first table is performed; and storing the value in the first column in the first set of columns of the first record.

9. The method of claim 8, wherein the set of data is a first set of data comprising a first set of values for a first set of attributes, wherein the data load process is a first data load process, wherein the subset of the first set of columns in the first table is a first subset of the first set of columns in the first table, wherein the value is a first value, the method further comprising:

receiving a second set of data for the first record in the first table, the second set of data comprising a second set of values for a second set of attributes;

in the second data loading process configured to load a subset of the second set of data into a second subset of the first set of columns in the first table, determining that the first column in the first set of columns in the first table belongs in the second subset of the first set of columns in the first table;

generating a second value for the first column in the first set of columns in the first table based on a subset of the second set of values for a subset of the second set of attributes; and replacing the first value with the second value in the first column in the first set of columns of the first record.

10. The method of claim 8, wherein a third column in the first set of columns in the first table is configured to refer to a fourth column in a third set of columns in a third table, wherein the value is a first value, the method further comprising:

in the first data loading process, determining that the third column in the first set of columns in the first table belongs in the subset of the first set of columns in the first table;

generating a second value for the third column in the first set of columns in the first table based on a subset of the set of values for a subset of the set of attributes, the second value referring to a third record in the third table, the third record comprising the subset of the set of values for the subset of the set of attributes; and storing the second value in the third column in the first set of columns of the first record.

11. The method of claim 10, wherein generating the second value comprises:

providing the subset of the set of values for the subset of the set of attributes as inputs to a hash function, wherein the hash function is configured to generate an output based on the subset of the set of values for the subset of the set of attributes; and using the output as the second value.

12. The method of claim 8 further comprising generating the second record in the second table.

13. The method of claim 8, wherein the second column in the second set of columns in the second table is configured to store unique values for identifying unique records in the second table, the method further comprising receiving a column definition for the second column in the second set of columns in the second table, the column definition specifying to generate a unique value for each record in the second table based on values for a subset of the second set of columns in the second table.

14. The method of claim 13, wherein generating the value is based on the column definition for the second column in the second set of columns in the second table.

15. A system comprising:

a set of processing units; and a non-transitory machine-readable medium storing instructions that when executed by at least one processing unit in the set of processing units cause the at least one processing unit to:

receive a set of data for a first record in a first table, the set of data comprising a set of values for a set of attributes, the first table comprising a first set of columns, wherein a first column in the first set of columns in the first table is configured to refer to a second column in a second set of columns in a second table;

in a first data loading process configured to load a subset of the set of data into a subset of the first set of columns in the first table, determine that the first column in the first set of columns in the first table does not belong in the subset of the first set of columns in the first table;

generate the first record in the first table;

generate a value for the first column in the first set of columns in the first table, the value referring to a second predefined record in the second table, wherein the second predefined record serves as a placeholder record referenced by the first column in the first table until a second data loading process configured to load data for the first column in the first table is performed; and store the value in the first column in the first set of columns of the first record.

16. The system of claim 15, wherein the set of data is a first set of data comprising a first set of values for a first set of attributes, wherein the data load process is a first data load process, wherein the subset of the first set of columns in the first table is a first subset of the first set of columns in the first table, wherein the value is a first value, wherein the instructions further cause the at least one processing unit to:

receive a second set of data for the first record in the first table, the second set of data comprising a second set of values for a second set of attributes;

in the second data loading process configured to load a subset of the second set of data into a second subset of the first set of columns in the first table, determine that the first column in the first set of columns in the first table belongs in the second subset of the first set of columns in the first table;

generate a second value for the first column in the first set of columns in the first table based on a subset of the second set of values for a subset of the second set of attributes; and replace the first value with the second value in the first column in the first set of columns of the first record.

17. The system of claim 15, wherein a third column in the first set of columns in the first table is configured to refer to a fourth column in a third set of columns in a third table, wherein the value is a first value, wherein the instructions further cause the at least one processing unit to:

in the first data loading process, determine that the third column in the first set of columns in the first table belongs in the subset of the first set of columns in the first table;

generate a second value for the third column in the first set of columns in the first table based on a subset of the set of values for a subset of the set of attributes, the second value referring to a third record in the third table, the third record comprising the subset of the set of values for the subset of the set of attributes; and store the second value in the third column in the first set of columns of the first record.

18. The system of claim 17, wherein generating the second value comprises:

providing the subset of the set of values for the subset of the set of attributes as inputs to a hash function, wherein the hash function is configured to generate an output based on the subset of the set of values for the subset of the set of attributes; and using the output as the second value.

19. The system of claim 15, wherein the instructions further cause the at least one processing unit to generate the second record in the second table.

20. The system of claim 15, wherein the second column in the second set of columns in the second table is configured to store unique values for identifying unique records in the second table, wherein the instructions further cause the at least one processing unit to receive a column definition for the second column in the second set of columns in the second table, the column definition specifying to generate a unique value for each record in the second table based on values for a subset of the second set of columns in the second table.

* * * * *